US012485411B2

(12) United States Patent
Dudek et al.

(10) Patent No.: US 12,485,411 B2
(45) Date of Patent: Dec. 2, 2025

(54) MULTI-CHANNEL PIPETTING SYSTEM OF IMPROVED DESIGN

(71) Applicant: GILSON SAS, Villiers-le-Bel (FR)

(72) Inventors: Bruno Dudek, Orry-la-Ville (FR); Stéphane Guichardon, Bougival (FR)

(73) Assignee: GILSON SAS, Villiers-le-Bel (FR)

( * ) Notice: Subject to any disclaimer, the term of this patent is extended or adjusted under 35 U.S.C. 154(b) by 615 days.

(21) Appl. No.: 17/907,007

(22) PCT Filed: Mar. 25, 2021

(86) PCT No.: PCT/FR2021/050517
§ 371 (c)(1),
(2) Date: Sep. 22, 2022

(87) PCT Pub. No.: WO2021/198593
PCT Pub. Date: Oct. 7, 2021

(65) Prior Publication Data
US 2023/0088226 A1 Mar. 23, 2023

(30) Foreign Application Priority Data
Mar. 31, 2020 (FR) ....................................... 2003160

(51) Int. Cl.
*B01L 3/02* (2006.01)

(52) U.S. Cl.
CPC ....... *B01L 3/0217* (2013.01); *B01L 2200/025* (2013.01); *B01L 2200/0689* (2013.01); *B01L 2200/087* (2013.01); *B01L 2300/0829* (2013.01)

(58) Field of Classification Search
None
See application file for complete search history.

(56) References Cited

U.S. PATENT DOCUMENTS 4,215,092 A 7/1980 Suovaniemi
2015/0209777 A1* 7/2015 Petrek .................. B01L 3/0224 73/864.18

FOREIGN PATENT DOCUMENTS

EP 1401580 B1 * 11/2004 ............ B01L 3/0217
EP 1634648 A1 3/2006
(Continued)

OTHER PUBLICATIONS

Website, https://design-encyclopedia.com/?T=Point%20Vs%20Line%20Contact, "Design+Encyclopedia, Point Vs Line Contact." Accessed Oct. 8, 2025 (Year: 2025).*
(Continued)

*Primary Examiner* — Maris R Kessel
*Assistant Examiner* — May Leung Chiu
(74) *Attorney, Agent, or Firm* — McDonald Hopkins LLC

(57) ABSTRACT

A device for a multi-channel pipetting system, comprising a piston holder, a guide rod of the piston holder, which guide rod is mounted slidably in a guide member, a plurality of pistons having a bottom end housed slidably in a suction chamber, and a piston head mounted on the piston holder by way of a mechanical connection. The mechanical connection comprises two contact points which conjointly define a piston-head rotation axis oriented orthogonally with respect to the transverse direction and to the longitudinal central axis of the pipetting system, and the device additionally comprises, associated with the piston, return spring which force the piston head upward against the piston holder, so as to establish the two contact points.

15 Claims, 20 Drawing Sheets

(56) References Cited

FOREIGN PATENT DOCUMENTS

| | | | | |
|---|---|---|---|---|
| NO | 2014113331 | A1 | 7/2014 | |
| WO | WO-2009051970 | A1 * | 4/2009 | ............ B01L 3/0217 |
| WO | 2010082080 | A1 | 7/2010 | |

OTHER PUBLICATIONS

Search Report for French application No. 2003160 dated Nov. 26, 220.

International Search Report for PCT/FR2021/050517 dated Sep. 1, 2021 and translation thereof.

Written Opinion for PCT/FR2021/050517 dated Sep. 1, 2021.

* cited by examiner

MULTI-CHANNEL PIPETTING SYSTEM OF IMPROVED DESIGN

CROSS-REFERENCE TO RELATED APPLICATIONS

This is a National Stage of PCT international application PCT/FR2021/050517, filed on Mar. 25, 2021, which claims the priority of French Patent Application No. 2003160, filed Mar. 31, 2020, both of which are incorporated herein by reference in their entirety.

TECHNICAL FIELD

The present invention relates to the field of multi-channel pipetting systems, such as multi-channel sampling pipettes, also referred to as laboratory pipettes or else air-displacement liquid transfer pipettes, intended for the calibrated sampling and introduction of liquid in containers.

The invention applies preferably to sampling pipettes intended to be held in the hand by an operator during the operations of sampling and dispensing liquid, but also applies to automated pipetting systems.

PRIOR ART

From the prior art, multi-channel sampling pipettes are known having a design of the type integrating a body forming a handle, as well as a lower part having at its end several pipette sampling cone holder tips, the known function of which is to carry sampling cones, also called consumables.

In a known manner, the basic principle of a multi-channel pipette is based on the variation of a volume, which causes a drop in pressure and the rise of the liquid in the sampling cone. Gravimetry specifications are usually established according to the volume differences delivered between each pipetting, and between each channel of the multi-channel pipette. This results in a need to control the movement of all the pistons generating pressure variations.

On a manual (also called mechanical), motorised or hybrid multi-channel pipette, provision is made of a piston holder extending in a transverse direction of the pipette, this piston holder being conventionally referred to as a “rake”. Provision is also made of a rod for guiding the piston holder extending parallel to a central longitudinal axis of this same pipette. In addition, a guide member allows the guide rod to be slidably guided along the central longitudinal axis. In this context, a plurality of pistons are distributed along the piston holder, each piston having a lower end slidably housed in a suction chamber, as well as a piston head mounted on the piston holder via a mechanical connection for mounting the piston on the piston holder.

Each mechanical connection for mounting a piston on the piston holder generally includes a flat support orthogonal to the plane of the pistons, conferring a certain rigidity on this connection. This can thus generate a resulting torque, with an axis perpendicular to the plane of the pistons and passing through the axis of the sliding connection of the guide rod. This parasitic torque leads to two major disadvantages, the first residing in the observation of a “rake effect”, and the second corresponding to non-negligible friction of the piston holder and the other moving elements of the pipette, during their translational movement. As a reminder about the first disadvantage, the rake effect is quantified by the difference in volume delivered between the two opposite extreme channels of the multi-channel pipette. This effect is therefore directly impacted by the angular amplitude of displacement of the piston holder, in the clearance of the sliding guide connection of the rod supporting this same piston holder. Therefore, due to the rake effect observed on current designs, multi-channel pipettes have limited gravimetric performance.

On the second disadvantage relating to friction and possible jamming of the moving elements of the multi-channel pipette, the latter is affected in terms of ergonomics, particularly with regard to pipetting and purging forces.

It is noted that identical or similar disadvantages are also observed on motorised or hybrid pipettes, or else on any other type of multi-channel pipetting system. Alternatively, it may be a cassette forming a lower part intended to be connected to an articulated arm of an automaton.

Moreover, on multi-channel pipettes including a return and/or purge spring, when it is compressed, this spring generates another parasitic torque on the guide rod, with an axis corresponding to its axis of translation within the connection sliding guide. The parasitic torque is transmitted to the piston holder, with the consequence that it is subjected to another parasitic rotational movement, around the aforementioned translation axis. This is another source of difference in pipetting stroke between the pistons, depending on their distance from the central longitudinal axis of the pipette. This also generates risks of additional friction/jamming between the piston holder and the fixed surrounding elements of the pipette.

In conclusion, the return and/or purge spring is likely to further degrade the gravimetric performance of the pipette, as well as the ergonomics of use of the pipette with regard to pipetting and purging forces.

DESCRIPTION OF THE INVENTION

The object of the invention is therefore to propose a solution at least partially overcoming the problems mentioned above, encountered in the solutions of the prior art.

For this purpose, the invention firstly relates to a device for a multi-channel pipetting system, the device comprising:

- a piston holder extending in a transverse direction of the pipetting system;
- a rod for guiding the piston holder, the guide rod extending parallel to a central longitudinal axis of the pipetting system, and orthogonal to the piston holder;
- a member for guiding the guide rod, the latter being slidably mounted in the guide member, along the central longitudinal axis;
- a plurality of pistons distributed along the piston holder, each piston having a lower end slidably housed in a suction chamber, as well as a piston head mounted on the piston holder via a connection mechanism for mounting the piston on the piston holder;
- a row of sampling cone holder tips distributed along the transverse direction of the pipetting system, each tip communicating with one of the suction chambers, respectively. According to the invention, the mechanical mounting connection, for at least one of the pistons and preferably for several or for all of them, includes two contact points jointly defining an axis of rotation of the piston head oriented orthogonally or substantially orthogonally to the transverse direction and to the central longitudinal axis of the pipetting system. The device further includes, associated with said piston, elastic return means forcing the piston head upwards against the piston holder, for the establishment of the two contact points.

The invention thus breaks with the principle usually implemented on multi-channel pipetting systems, namely the fact of providing a relatively high rigidity for the connections between the piston holder and the pistons, leading to a kind of embedding of the heads of the piston in the piston holder. In the invention, conversely, a certain flexibility is introduced into these connections, with the possibility for the piston head to pivot around its axis of rotation, defined by the two points of contact with the piston holder.

This degree of freedom of movement tolerated at the piston heads allows first of all to limit the rake effect on the piston holder, which advantageously leads to gains in terms of precision/repeatability, allowing better gravimetric performance to be obtained for the pipetting system. This degree of freedom of movement also allows to limit friction and the risks of jamming of the elements moving in translation, in particular the piston holder and the pistons. This advantageously results in a reduction in pipetting and purging forces, thus leading to better ergonomics of use of the pipette when it is manual, or else to a reduction in the size of the drive motor and the battery on the motorised and hybrid pipettes. Furthermore, thanks to the particular positioning of the two contact points of the mechanical mounting connection of the piston head, it becomes easy to take up the parasitic torque resulting from the return and/or purge spring, using the seals equipping the pistons. Indeed, this parasitic torque exerted along the axis of translation of the guide rod is directly transmitted to the piston holder, then to the pistons, and finally to the seals which establish radial contact points in their respective suction chambers. This way of taking up the parasitic torque along the axis of translation of the guide rod, via the piston seals, greatly limits the rake effect while reducing the friction of the moving parts of the pipette. The gravimetric performance of the pipette is further increased, and pipetting and purging forces can be further reduced.

Furthermore, the use of piston seals to take up this parasitic torque allows to simplify the design of the pipetting system, and thus to reduce its weight, since the opposite ends of the piston holder no longer need to be individually guided by fixed parts of this system. On the contrary, the opposite ends of the piston holder can remain free, without connection with the other parts of the pipetting system.

Finally, it is noted that the proposed solution advantageously allows the piston seals to withstand a high number of cycles in the autoclave, while continuing to provide the required sealing at their associated suction chambers, and without generating friction forces that are detrimental to ergonomics. Thus, the proposed solution proves to be particularly efficient in terms of gravimetry and ergonomics of use, while ensuring a satisfactory lifespan for the piston seals.

The invention also preferably includes at least one of the following optional features, taken in isolation or in combination.

Preferably, the elastic return means are formed by a helical spring of generally conical shape, with a section that tapers from the bottom upwards. The shape and orientation of this spring facilitate the pivoting of the piston head around the axis of rotation of the piston head, while ensuring the axial pressing of the piston against the piston holder.

Alternatively, the elastic return means are formed by a spring in the form of a deformed wire.

The piston holder has two opposite free transverse ends.

The guide rod is slidably mounted in the guide member, via two sliding pivot connections spaced from each other along the central longitudinal axis.

Each piston carries, at its lower end, a seal bearing against an inner surface of the suction chamber associated with the piston.

Preferably, the seal is a lip seal.

The two contact points of each mechanical mounting connection are arranged symmetrically with respect to an associated piston axis.

The two contact points of each mechanical mounting connection are made in any of the following ways:

- using a toroidal surface provided on the piston, and two flat surfaces inclined relative to each other, and provided on the piston holder;
- using a spherical surface provided on the piston, and two flat surfaces inclined relative to each other, and provided on the piston holder;
- using a conical surface provided on the piston, and two spherical surfaces provided on the piston holder;
- using a flat surface provided on the piston, and two spherical surfaces provided on the piston holder;
- using a spherical surface provided on the piston, and two spherical surfaces provided on the piston holder;
- using a spherical surface provided on the piston, and two cylindrical surfaces provided on the piston holder, with secant axes; or
- using a toroidal surface provided on the piston, and two cylindrical surfaces provided on the piston holder, with secant axes.

According to a preferred embodiment of the invention, the suction chambers have parallel chamber axes.

All the chamber axes can be arranged in the same transverse plane of the pipetting system, or else arranged in a staggered manner in two separate parallel transverse planes of the pipetting system. In the latter case, the piston heads can also be arranged in a staggered manner in the same two transverse planes defined by the chamber axes, so that these chamber axes coincide in pairs with the piston axes. Alternatively, the piston heads can all be aligned along a transverse line arranged parallel to and between the two transverse planes defined by the chamber axes, so that the piston axes are inclined with respect to their corresponding chamber axes.

Preferably, the piston holder is made in two parts fixed on each other, and between which are arranged the piston heads and the elastic return means. Alternatively, the piston holder is made in one-piece, for example for pipettes intended for sampling small volumes, such as 200 or 300 μL.

Finally, the invention also relates to a multi-channel pipetting system comprising such a device, the pipetting system preferably being a manual, motorised or hybrid sampling pipette. Alternatively, it can for example be an automated pipetting system.

Other advantages and features of the invention will appear in the non-limiting detailed description below.

BRIEF DESCRIPTION OF THE DRAWINGS

This description will be given with regard to the appended drawings, among which.

DETAILED DESCRIPTION OF PREFERRED EMBODIMENTS

Figure 1:
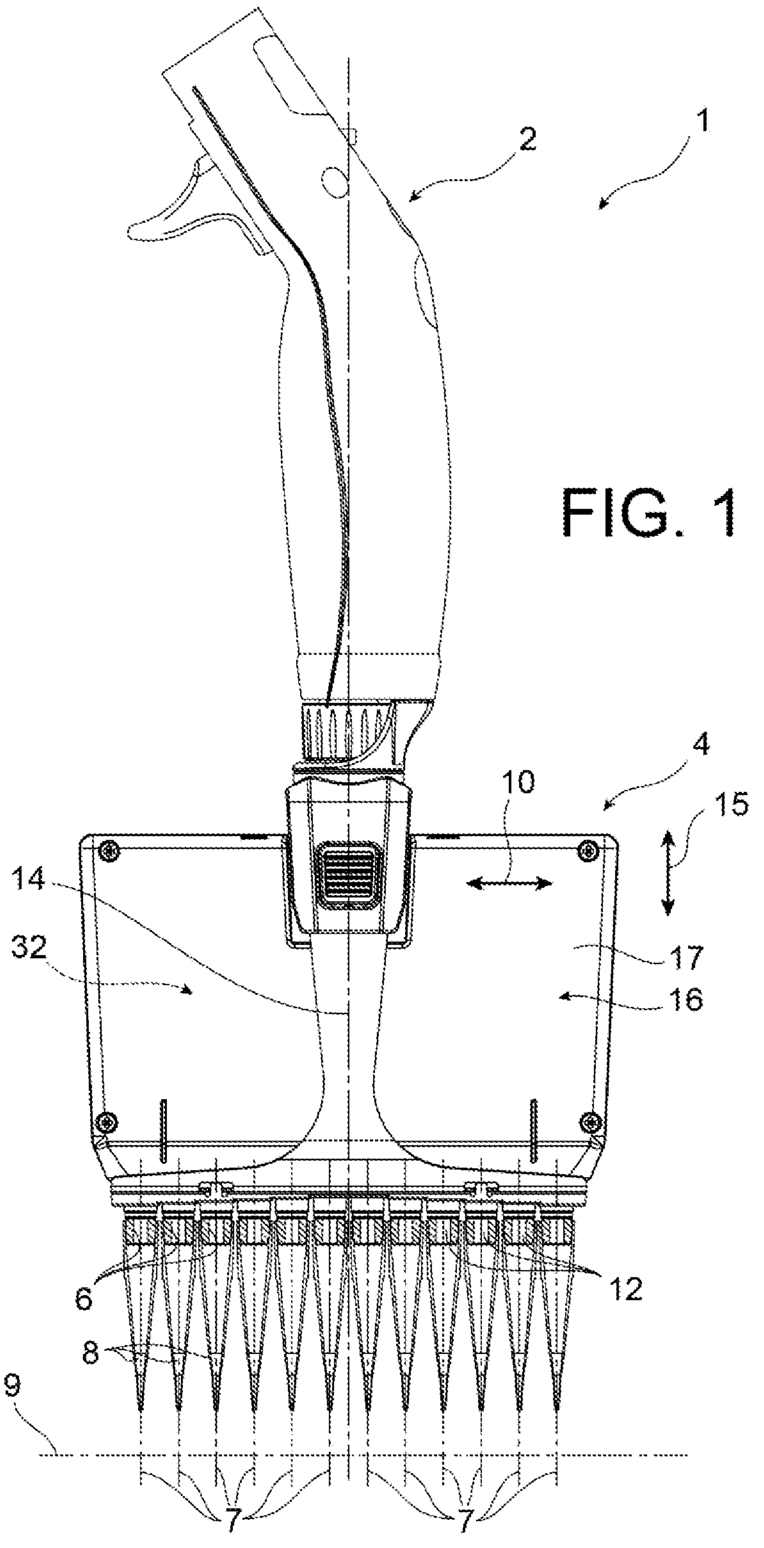
FIG. 1 shows a front view of an air-displacement multi-channel sampling pipette.
Figure 2:
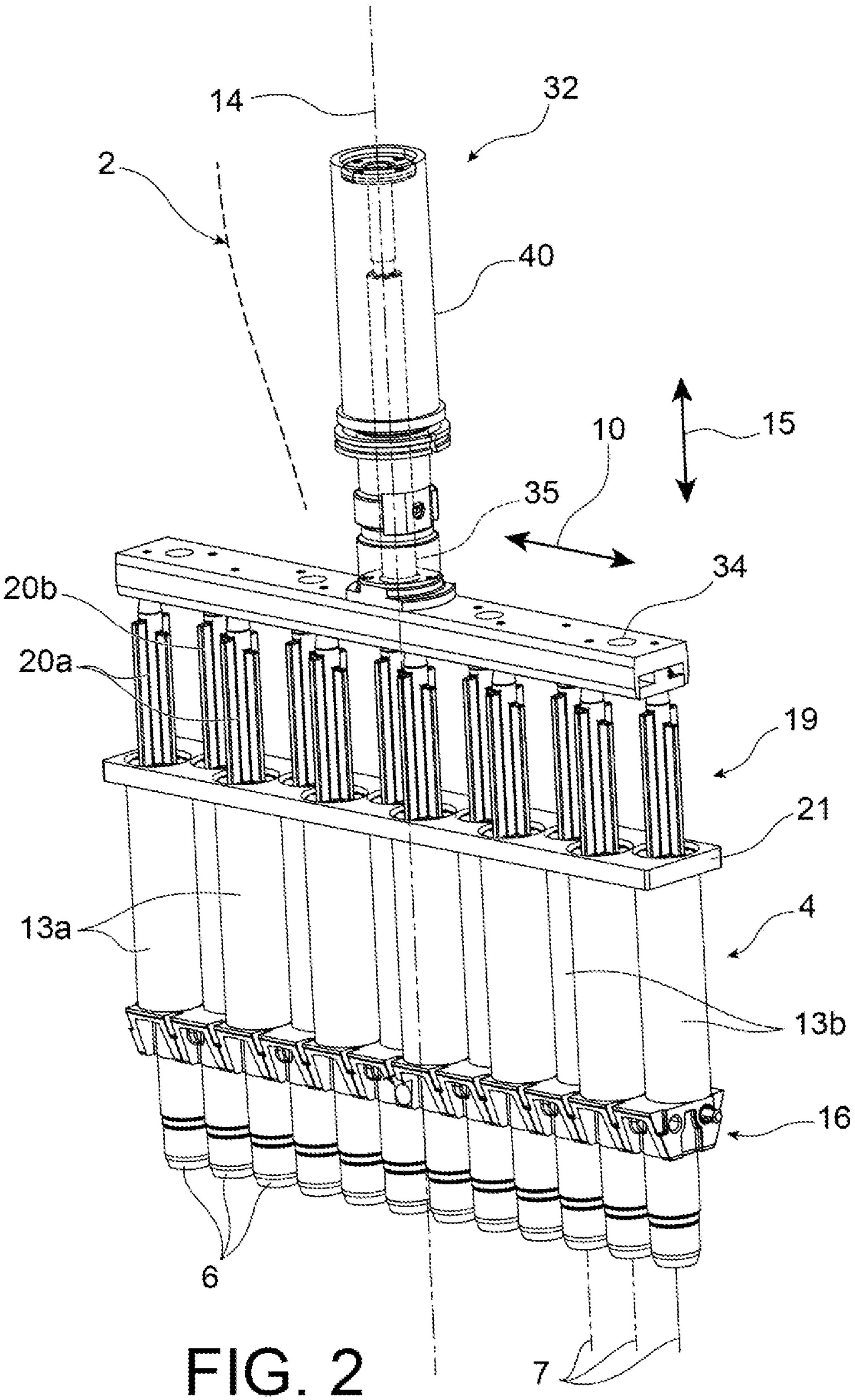
FIG. 2 shows a view of a device according to a first preferred embodiment of the invention, forming an integral part of the pipette shown in the previous figure.
Figure 3:
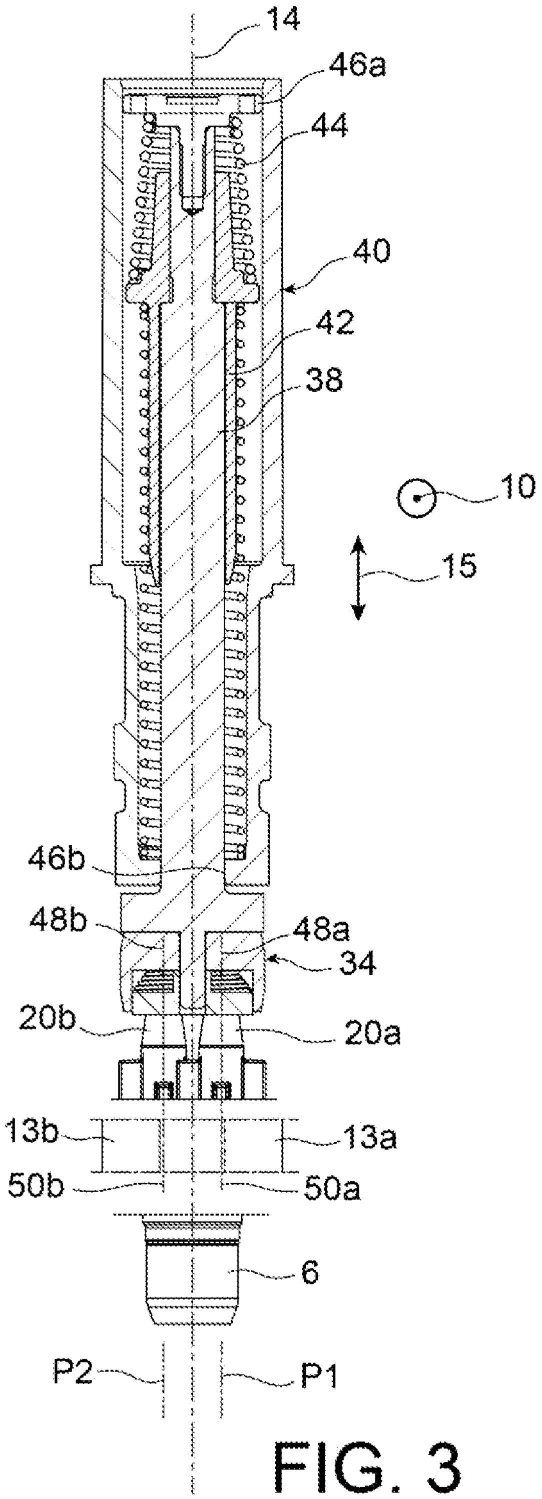
FIG. 3 shows an axial sectional view of an upper part of the device shown in FIGS. 2 and 2*a;*

With reference first to FIGS. 1 to 3, a multi-channel sampling pipette 1 is shown according to a preferred embodiment of the present invention. Nevertheless, the invention is not limited to pipettes, but applies to any multi-channel pipetting system, and in particular to automated pipetting systems, called automata.

In this embodiment of FIGS. 1 to 3, the pipette is preferably intended for sampling high volumes, for example 1200 μl. However, its design is also adapted for sampling smaller volumes, for example 200 or 300 μL.

The manual, motorised or hybrid air-displacement pipette 1, comprises in the upper part a body forming a handle 2, as well as a lower part 4 integrating at its lower end sampling cone holder tips 6, on which cones or consumables 8 are intended to be press-fitted.

The sampling cone holder tips 6 are spaced from each other in a transverse direction of the pipetting system, also called the lateral direction of the pipette, and represented by the arrow 10. Each tip 6 has a through orifice 12 communicating at its upper end with a suction chamber 13*a*, 13*b*, and at its lower end with a sampling cone 8. The through-orifice 12 is centred or not on its associated tip 6, that is to say whether it is centred or not on a central axis 7 of the tip on which the press-fitted cone is centred.

The pipette 1 has a central longitudinal axis 14, also corresponding to a central longitudinal axis of the lower part 4, and also to that of a device 32 specific to the invention. This axis 14, parallel to a direction of the height 15 of the pipette, is orthogonal to the transverse direction 10. The central longitudinal axis 14, crossing the handle 2, is usually placed so as to have an identical number of tips 6 disposed on either side of the latter, in the transverse direction 10. Furthermore, generally, the axis 14 is parallel to the axes of the through orifices 12 and to the axes 7 of their associated tips and cones 6, 8, and also parallel to the direction of the height 15, corresponding to a direction of sliding/translation of the movable elements of the pipette, which will be described below.

In the example shown in FIGS. 1 to 3, provision is made of twelve tips 6 aligned in the direction 10, so as to form a single transverse row of tips. Also, the central axis 7 of each tip 6 intercepts the same straight line 9 extending in the direction 10.

As is known to the person skilled in the art, the lower part 4 is preferably mounted in a screwed manner on the body 2 forming the handle.

One of the particularities of the invention lies in the design of the device 32, which forms almost all the lower part 4, as well as a small portion of the handle 2. The device 32 is shown in its entirety on FIG. 2, but the description of its first preferred embodiment will be made with regard to all FIGS. 2 to 9.

In a known manner, the lower part 4 comprises a fixed body 16, as well as an assembly 19 that is movable relative to this fixed body 16, in the direction of sliding 15.

The fixed body 16 of the lower part of the pipette is made using several elements that are integral with each other, attached or made in one-piece. These are in particular the suction chambers 13*a*, 13*b*, and the cone holding tips 6, these elements being completed by a fixed transverse retaining plate 21 traversed by the upper end of the chambers 13*a*, 13*b*. As partially shown in FIG. 2*a*, an outer removable cover 17 is arranged around the fixed body 16, this cover generally covering the lower part of the device 32, so that only a lower part of the tips 6 projects downwards outside this cover 17. The latter has recesses on the inside for housing the edges of the fixed transverse retaining plate 21.

The movable assembly 19 in turn includes a piston holder 34, also called a rake, in the general shape of a bar which extends in the transverse direction 10, inside the cover 17. Pistons 20*a*, 20*b* are distributed along the piston holder, being regularly spaced from each other in the transverse direction 10, and each oriented parallel to the axis 14. The piston holder 34 is located globally above the pistons 20*a*, 20*b*, so as to be able to house the piston heads. More precisely, these piston heads are blocked in translation by the piston holder 34 in both directions of the sliding direction 15, in order to be able to follow the back-and-forth movement of the piston holder in this same direction.

Each piston 20*a*, 20*b* has a lower end slidably housed in one of the associated suction chambers 13*a*, 13*b*, themselves each communicating with one of the tips 6.

The movable assembly 19 of the lower pipette part 4 is fixedly connected to a guide rod 38 of the piston holder 34. The guide rod 38 extends parallel to the central longitudinal axis 14, for example being centred on the latter, implying that this rod 38 also extends orthogonally to the piston holder 34. It passes through the handle 2, being slidably mounted along the axis 14, in a fixed guide member 40 forming an integral part of the lower part of the pipette 4, while also penetrating into the handle 2.

More specifically, the guide rod 38 slidably housed in the fixed guide member 40, along the axis 14 is shown with reference to FIG. 3. Provision is made, radially between the two, of a return spring 42 for pipetting operations, and a purge spring 44. These are cylindrical helical compression springs, axially bearing against the guide rod 38. In the upper part of this rod 38, a shoulder 46*a* cooperates with an inner surface of the hollow guide member 40, so as to form a first sliding pivot connection. In addition, at its lower end, the guide member 40 has a bore 46*b* through which the rod 38 passes with minimal clearance, so as to form a second sliding pivot connection spaced from the first one in the direction 15. The spacing between the two connections is thus as high as possible, so as to obtain efficient guiding and to best limit the parasitic clearances of the guide rod 38.

Figure 4:
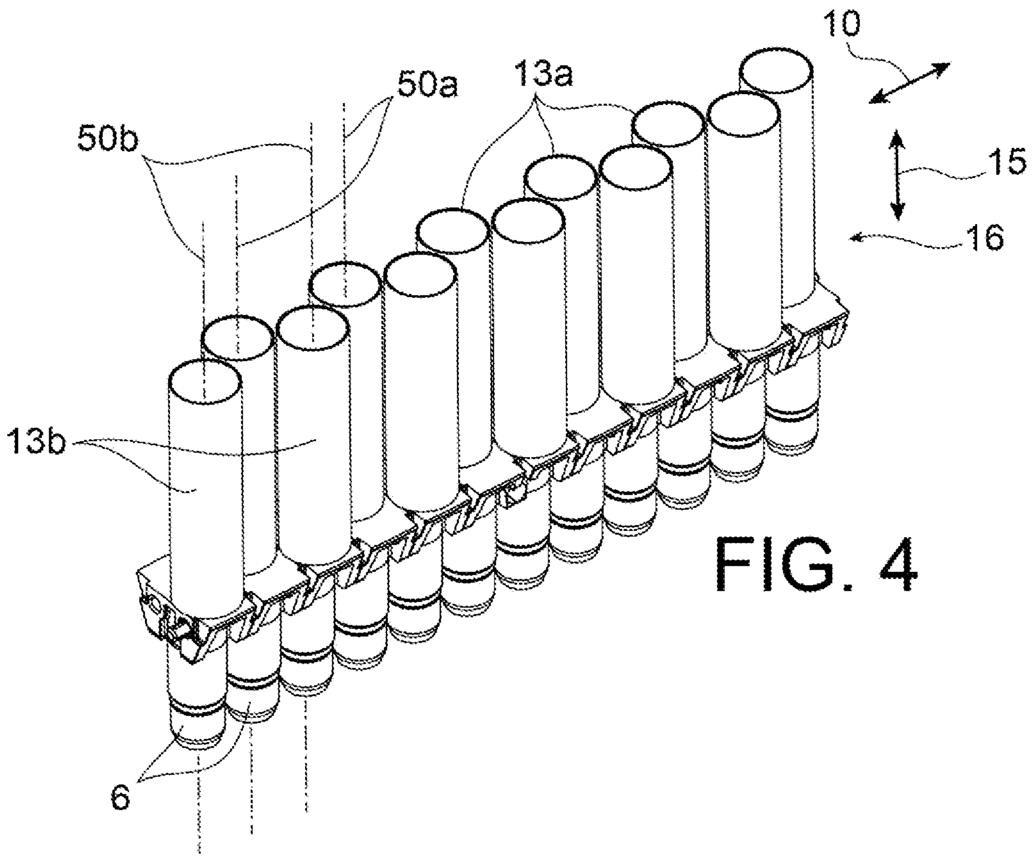
FIG. 4 is a perspective view of a lower part of the device shown in FIGS. 2 and 2*a;*
Figure 5:
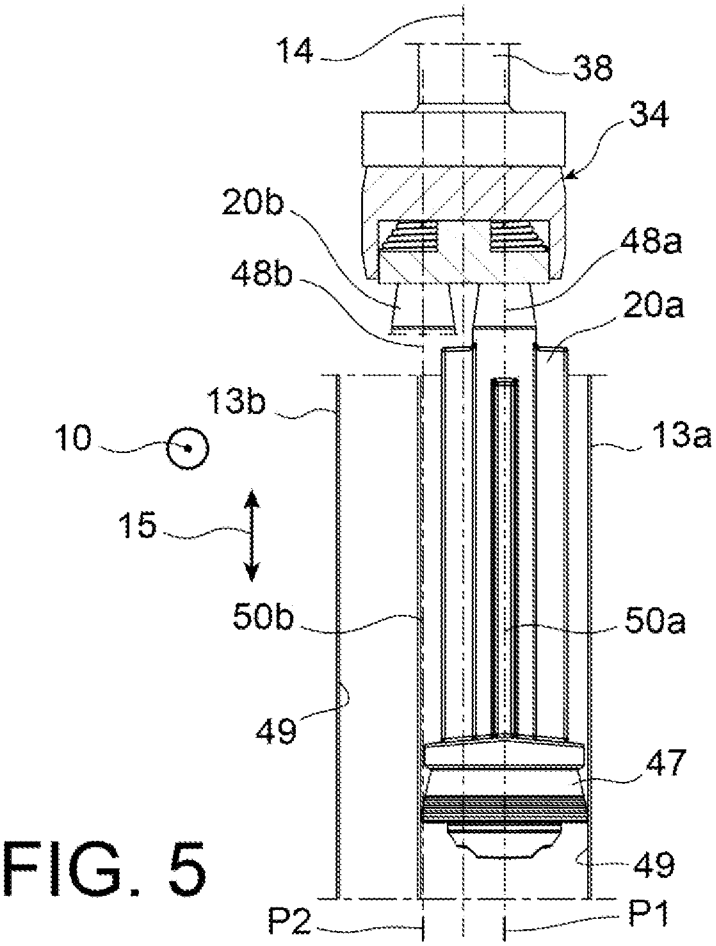
FIG. 5 is a side view of a lower part of the device.

For this first preferred embodiment, FIGS. 3 to 5 show one of the particularities of the pipette concerning the arrangement of the chambers 13*a*, 13*b*, and the pistons 20*a*, 20*b*. The pistons are disposed in a staggered manner, so as to form two transverse and parallel rows. First pistons 20*a* form a first row of pistons by fitting in a first transverse plane P1 of the pipette, that is to say that the piston axes 48*a* of these first pistons 20*a* are all fitted in the same transverse plane P1, parallel to directions 10 and 15. Similarly, second pistons 20*b* form a second row of pistons by being inscribed in a second transverse plane P2 of the pipette, parallel to and distinct from the plane P1. The piston axes 48*b* of these second pistons 20*b* are thus all inscribed in the same second transverse plane P2, also parallel to the directions 10 and 15. Furthermore, in this first embodiment, the piston axes 48*a*, 48*b* are parallel to each other, and the two planes P1, P2 located on either side of the axis 14. This particular arrangement of the pistons also applies to the suction chambers 13*a*, 13*b*. Indeed, the chambers are disposed in a staggered manner, so as to form two transverse and parallel rows. First chambers 13*a* form a first row of chambers by fitting in the first transverse plane P1, that is to say that the chamber axes 50*a* of these first chambers 13*a* are all fitted in the same transverse plane P1, being coincident in pairs with the piston axes 48*a* of the first associated pistons 20*a*. Similarly, second chambers 13*b* form a second row of chambers by fitting in the second transverse plane P2, that is to say that the chamber axes 50*b* of these second chambers 13*b* are all fitted in the same second transverse plane P2, merging in pairs with the piston axes 48*b* of the associated second pistons 20*b*.

Figure 5A:
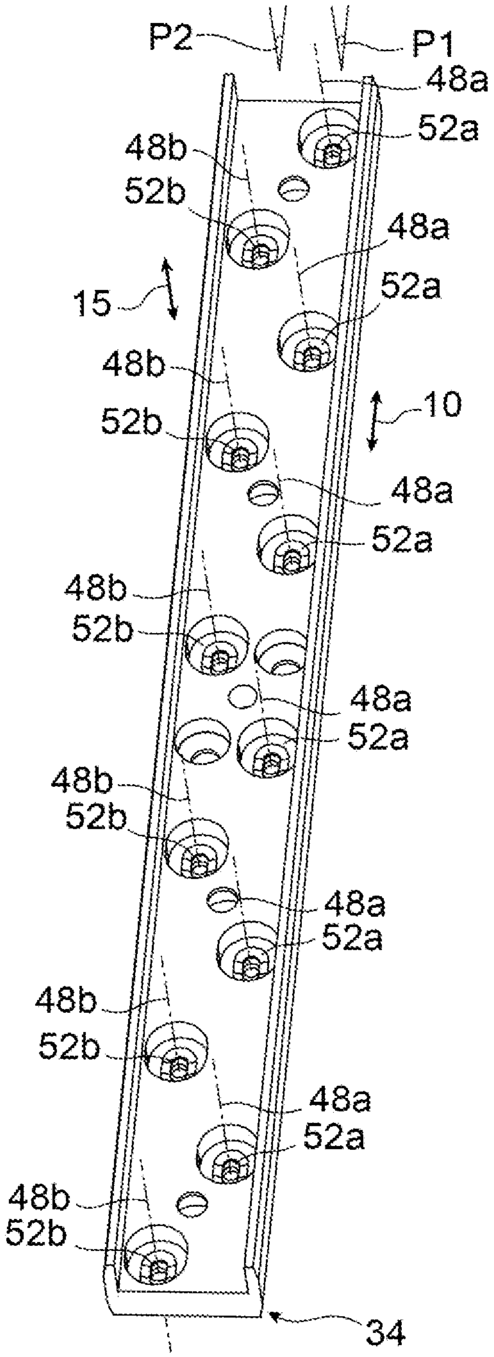
FIG. 5*a* shows a perspective view of the piston holder implemented in the first preferred embodiment.
Figure 5B:
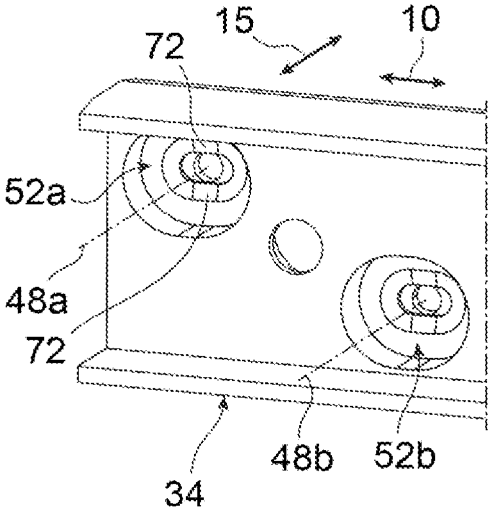
FIG. 5*b* is an enlarged perspective view of part of the piston holder shown in the previous figure.
Figure 6:
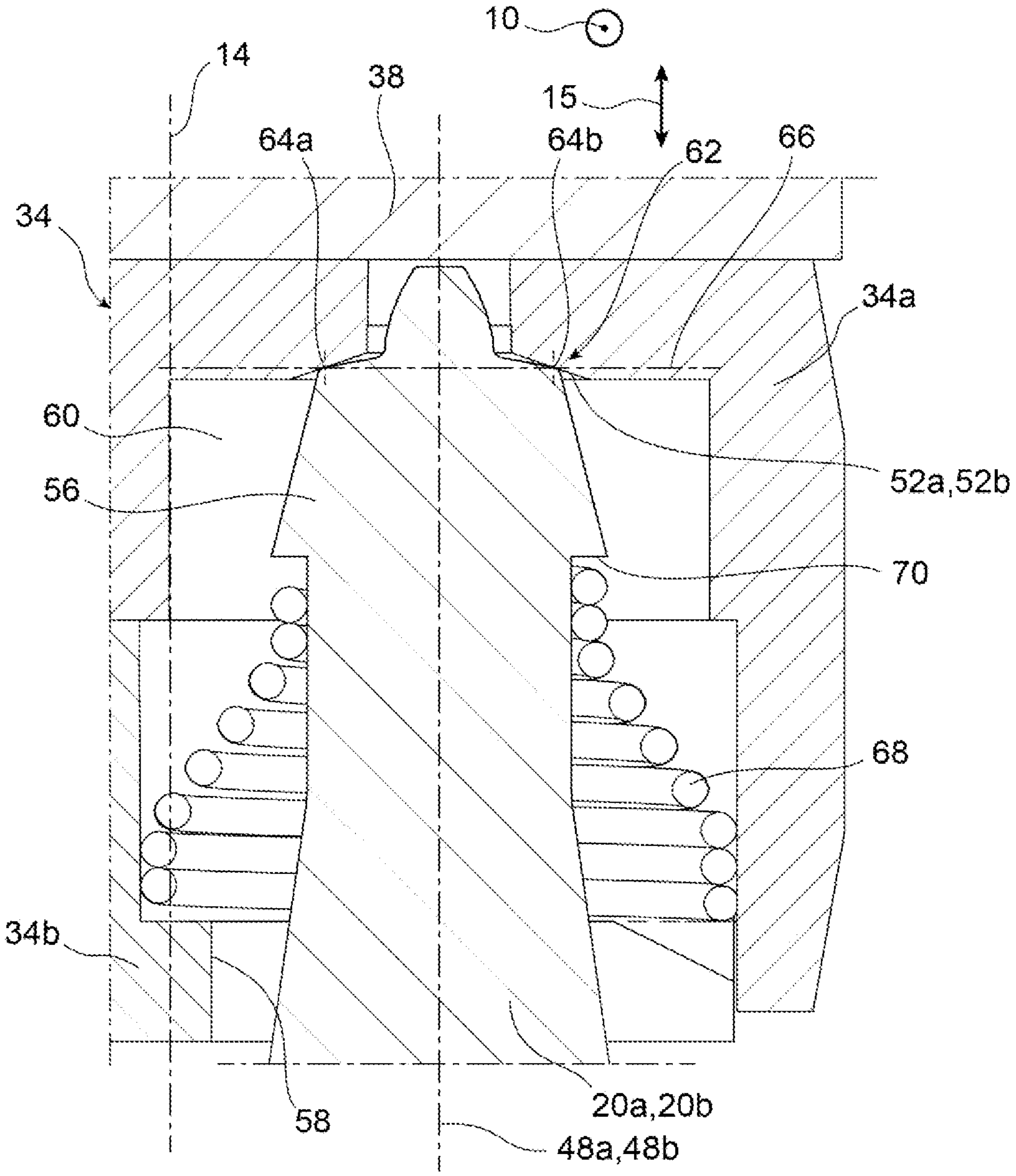
FIG. 6 shows an enlarged front view of part of the device shown in the preceding figures, showing the mechanical connection for mounting a piston on the piston holder.

As shown in FIGS. 5*a*, 5*b* and 6, to achieve this particular arrangement, the piston holder 34 includes a first series of seats 52*a* aligned in the transverse plane P1, and a second series of seats 52*b* aligned in the plane P2. The seats 52*a* are provided to house the piston heads 56 of the first pistons 20*a*, while the seats 52*b* are provided to house the piston heads 56 of the first pistons 20*b*.

FIG. 5 shows that the lower end of each piston 20*a*, 20*b* is provided with a seal 47, bearing against an inner surface 49 of the associated suction chamber 13*a*, 13*b*. The seal 47, for example made of elastomer material, is preferably a lip seal, even if other shapes can be considered, without departing from the scope of the invention.

The manner wherein the piston heads 56 cooperate with the piston holder is specific to the present invention, and it will be described with reference to FIG. 6. In this regard, it is noted that the teachings of this FIG. 6 apply both to the first and second pistons 20*a*, 20*b*. In the following, for convenience, reference will only be made to a first piston 20*a*.

First of all, the piston holder 34 is made in two parts 34*a*, 34*b*, fixed on each other by being stacked in the direction 15. The main part 34*a* is located above the other, and it is this main part which has a lower surface structured so as to reveal the seats 52*a*, 52*b* open downwards, for the reception of the piston heads 56. The other part 34*b* forms a simple closing cover, pierced with passage orifices 58 for the pistons 20*a*, 20*b*. The passage orifices 58 are thus aligned in pairs with the seats 52*a*, 52*b*, in order to form spaces 60 wherein the piston heads 56 are arranged. Alternatively, it remains possible to produce the piston holder 34 in a single part, that is to say made integrally/in one-piece, for example by moulding. This solution of producing the rake 34 in one-piece is moreover preferred, for example, for the pipette lower parts intended for sampling small volumes, such as 200 or 300 μL.

FIG. 6 shows a mechanical connection 62 for mounting the piston head 56 on the piston holder 34. This connection 62 is preferably that adopted for all the pistons 20*a*, 20*b* of the pipette. It includes two contact points 64*a*, 64*b* jointly defining an axis of rotation of the piston head 66. This two-point connection 62 is such that the axis of rotation of the piston head 66 is oriented orthogonally or substantially orthogonally to the transverse direction 10, and to the axis 14. In other words, this axis of rotation 66 is oriented orthogonally to the bar-shaped piston holder 34, which allows the piston 20*a* to pivot around its head relative to the pistons 34, in a transverse plane defined by these same two elements 20*a*, 34.

The two contact points 64*a*, 64*b* are arranged symmetrically with respect to the piston axis 48*a*, being moreover diametrically opposite on the seat 52*a*.

To maintain the two contact points 64*a*, 64*b*, the device 32 also includes a return spring 68 forcing the piston head 56 upwards, against the seat 52*a* of the piston holder 34. The spring 68 is here a helical spring of generally conical shape, with a section tapering from the bottom upwards, and preferably centred on the piston axis 48*a*. The shape and orientation of this spring 68 facilitate the pivoting of the piston head 56 around the axis of rotation 66, while ensuring the axial pressing of the piston 20*a* against the piston holder 34. The spring 68, housed in the space 60 thus has a lower end bearing against the closure cover 34*b*, and an upper end of smaller diameter, bearing against a shoulder 70 of the piston 20*a*.

FIGS. 7*a* to 7*g* show several geometric alternatives for obtaining the two contact points 64*a*, 64*b* of the mechanical mounting connection 62.

Figure 7A:
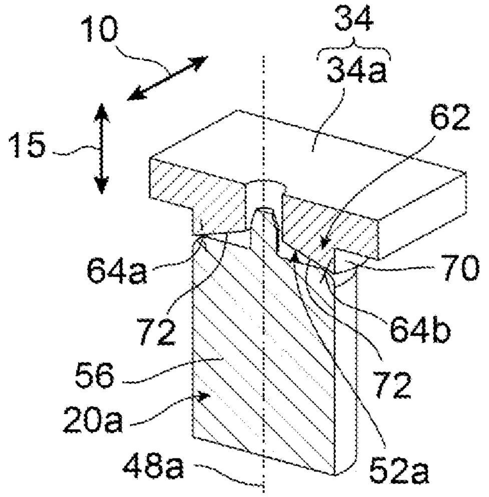
FIG. 7*a* is a partial perspective view of the mechanical mounting connection shown in the previous figure.

First of all in FIG. 7*a*, provision is made on the piston head 56 of a surface 70 centred on the piston axis 48*a*, this surface 70 here being toroidal. It resides in bi-punctual bearing on two members 72 of the seat 52*a*, arranged symmetrically with respect to the piston axis 48*a*. Here, the two members 72 are two flat surfaces inclined with respect to each other and parallel to the transverse direction 10, these surfaces 72 also being visible in FIG. 5*b*.

Figure 7B:
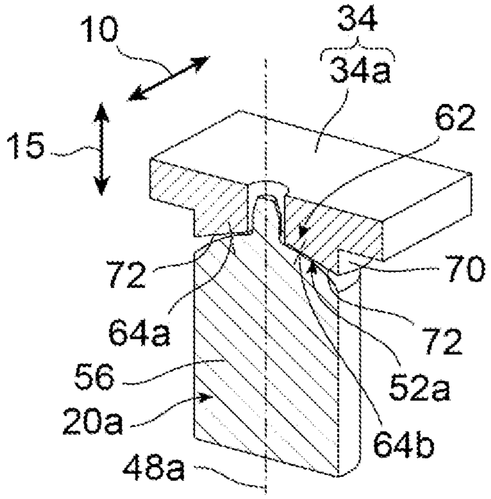
FIG. 7*b* is a partial perspective view of the mechanical mounting connection, according to an alternative.

In FIG. 7*b*, the surface 70 is a spherical surface, and it contacts the two inclined flat surfaces 72 provided on the piston holder.

Figure 7C:
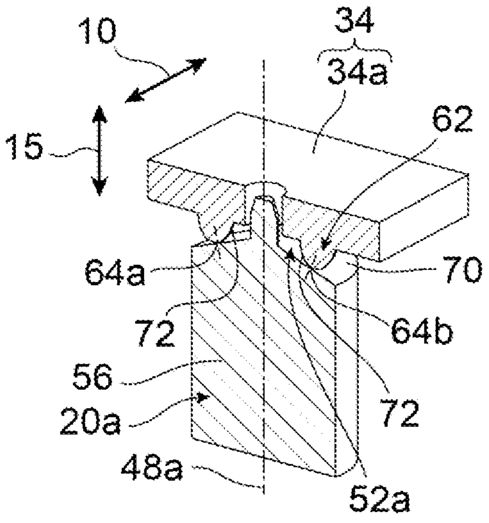
FIG. 7*c* is a partial perspective view of the mechanical mounting connection, according to yet another alternative.

In FIG. 7*c*, the surface 70 is a conical surface, and it contacts two spherical surfaces 72 provided on the piston holder.

Figure 7D:
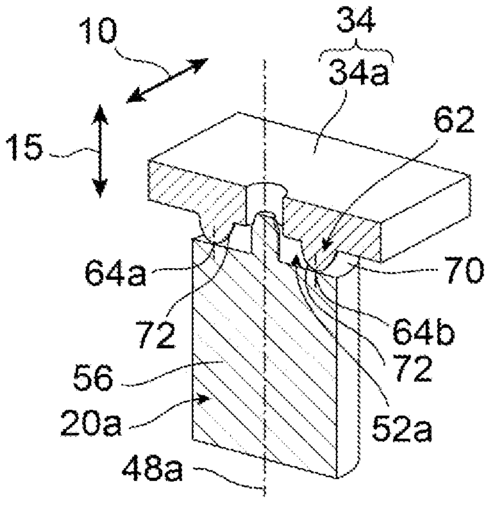
FIG. 7*d* is a partial perspective view of the mechanical mounting connection, according to yet another alternative.

In FIG. 7*d*, the surface 70 is a flat surface orthogonal to the piston axis 48*a*, and it contacts two spherical surfaces 72 provided on the piston holder.

Figure 7E:
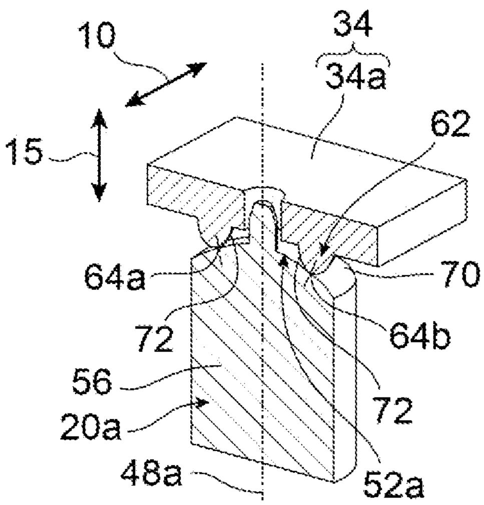
FIG. 7*e* is a partial perspective view of the mechanical mounting connection, according to yet another alternative.

In FIG. 7*e*, the surface 70 is a spherical surface provided on the piston, and it contacts two spherical surfaces 72 provided on the piston holder.

Figure 7F:
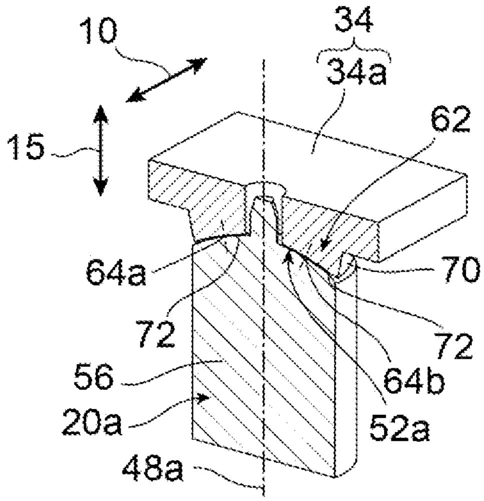
FIG. 7*f* is a partial perspective view of the mechanical mounting connection, according to yet another alternative.

In FIG. 7*f*, the surface 70 is a spherical surface, and it contacts two cylindrical surfaces 72 provided on the piston holder, with intersecting axes at a point of the piston axis 48*a*.

Figure 7G:
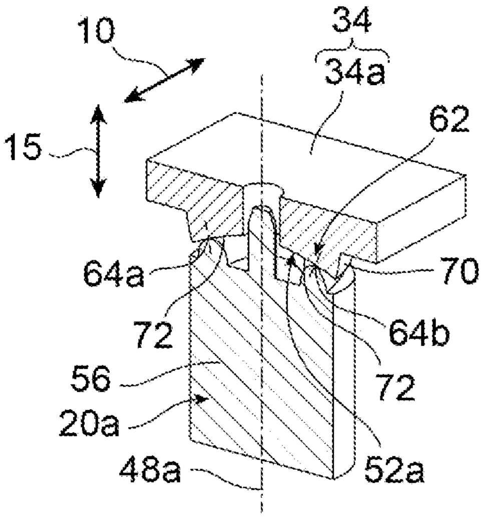
FIG. 7*g* is a partial perspective view of the mechanical mounting connection, according to yet another alternative.

Finally, in FIG. 7*g*, the surface 70 is a toroidal surface with axis 48*a*, and it contacts two cylindrical surfaces 72 provided on the piston holder, still with intersecting axes at a point on the piston axis 48*a*.

Figure 8:
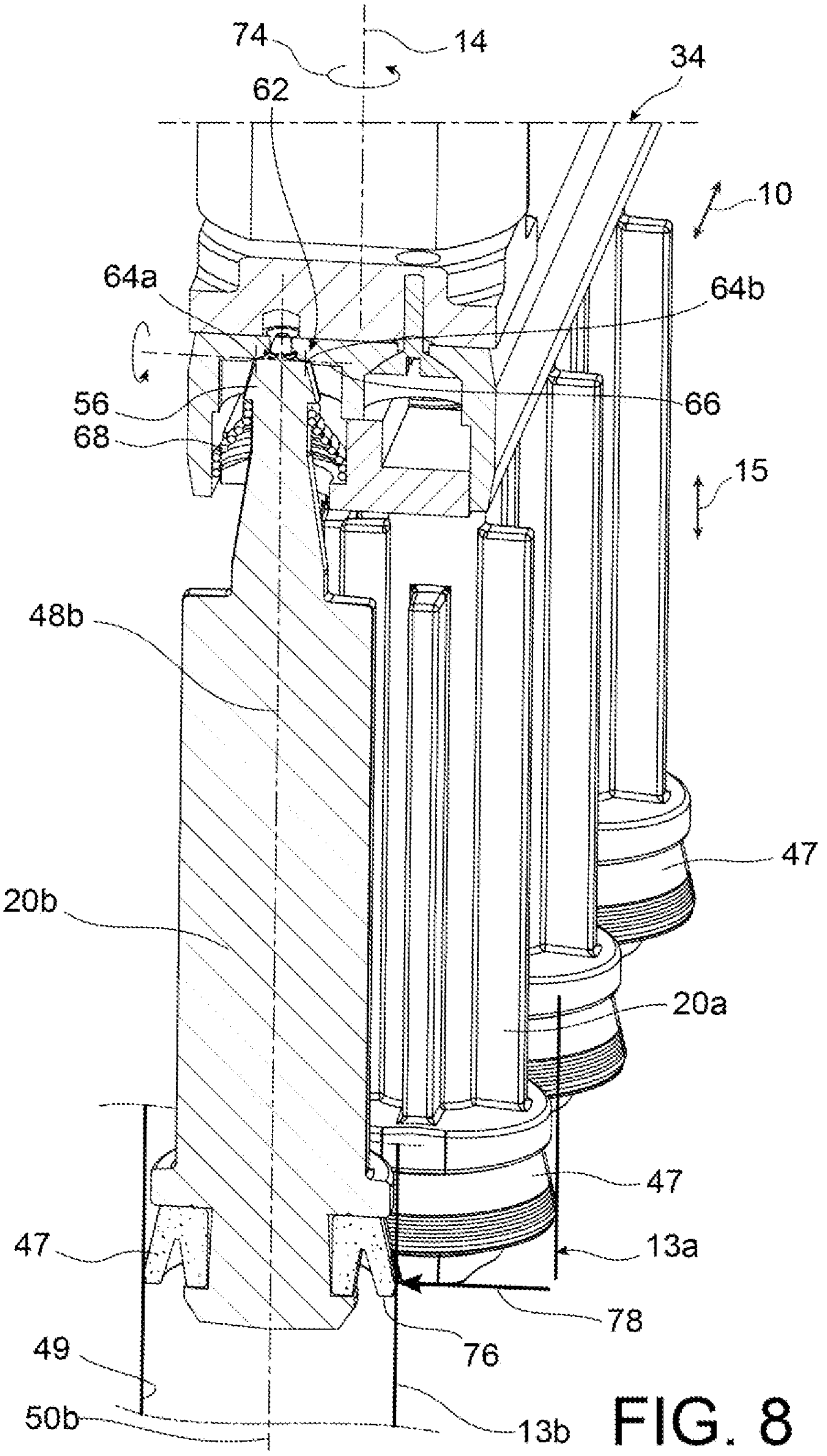
FIG. 8 shows a perspective view of the part of the device shown in FIG. 5.
Figure 9:
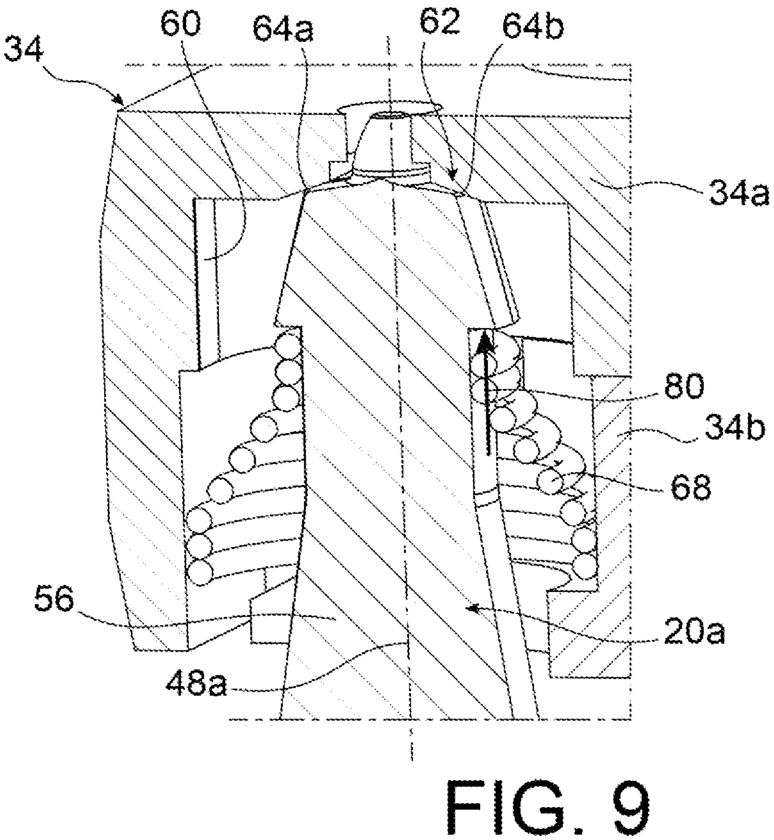
FIG. 9 shows a view similar to that of FIG. 6.

With reference to FIGS. 8 and 9, the various advantages conferred by the invention will be described.

First of all, thanks to the flexibility introduced into the mechanical mounting connection 62, the piston head 56 of each piston 20*a*, 20*b* can indeed pivot around its axis of rotation 66 defined by the two contact points 64*a*, 64*b*. This degree of freedom of movement allows to limit the rake effect on the piston holder 34, which advantageously leads to gains in terms of precision/repeatability, and obtaining better gravimetric performance. This degree of freedom of movement also allows to limit friction and the risks of jamming of the elements moving in translation, in particular the piston holder 34 and the pistons 20*a*, 20*b*. This advantageously results in a reduction in pipetting and purging forces, thus leading to better ergonomics of use of the pipette.

Moreover, thanks to the particular positioning of the two contact points 64*a*, 64*b*, it is possible to easily take up the parasitic torque resulting from the return and/or purge spring, this torque being exerted along the axis 14 and being referenced schematically by the arrow 74 in FIG. 8. This take-up takes place using the seals 47 equipping the lower end of the pistons 20*a*, 20*b*. Indeed, this parasitic torque 74 is directly transmitted to the piston holder 34, then to the pistons 20*a*, 20*b*, and finally to the seals 47 which establish radial contact points 76 on the inner surface 49 of their respective chambers 13*a*, 13*b*. These radial contacts, one of which is schematically referenced by the arrow 78 in FIG. 8, are maintained without parasitic rotation of the piston in a plane integrating the axis 66 and parallel to the direction 15, in particular thanks to the return force of the spring 68 referenced schematically by the arrow 80 in FIG. 9.

Figure 2A:
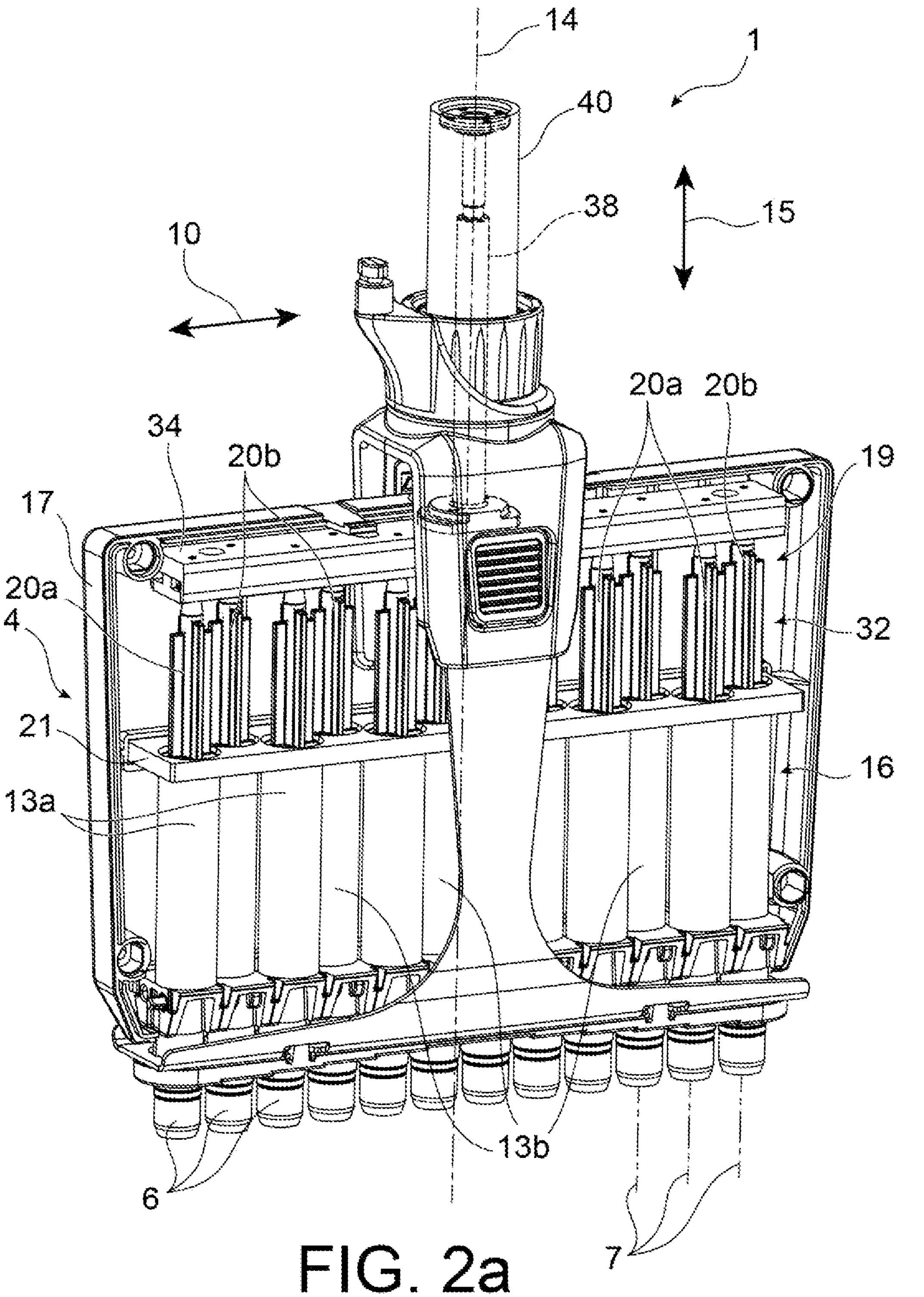
FIG. 2*a* shows a partial perspective view of the pipette shown in FIGS. 1 and 2.

This way of taking up the parasitic torque along the axis 14, via the piston seals 47, greatly limits the rake effect while reducing the friction of the moving elements of the pipette. The gravimetric performance is increased, and pipetting and purging forces are reduced. Furthermore, the use of the piston seals 47 to take up this parasitic torque along the axis 14 allows to simplify the design of the pipette, and to reduce its weight. Indeed, the opposite transverse ends of the piston holder 34 no longer need to be individually guided by fixed parts of the pipette, and they are moreover preferentially free in the interior space defined by the cover 17 of the lower part, as seen in FIG. 2*a*. "Free" ends, mean ends having no direct mechanical connection with the other parts of the pipette, in particular with the fixed parts.

Figure 10:
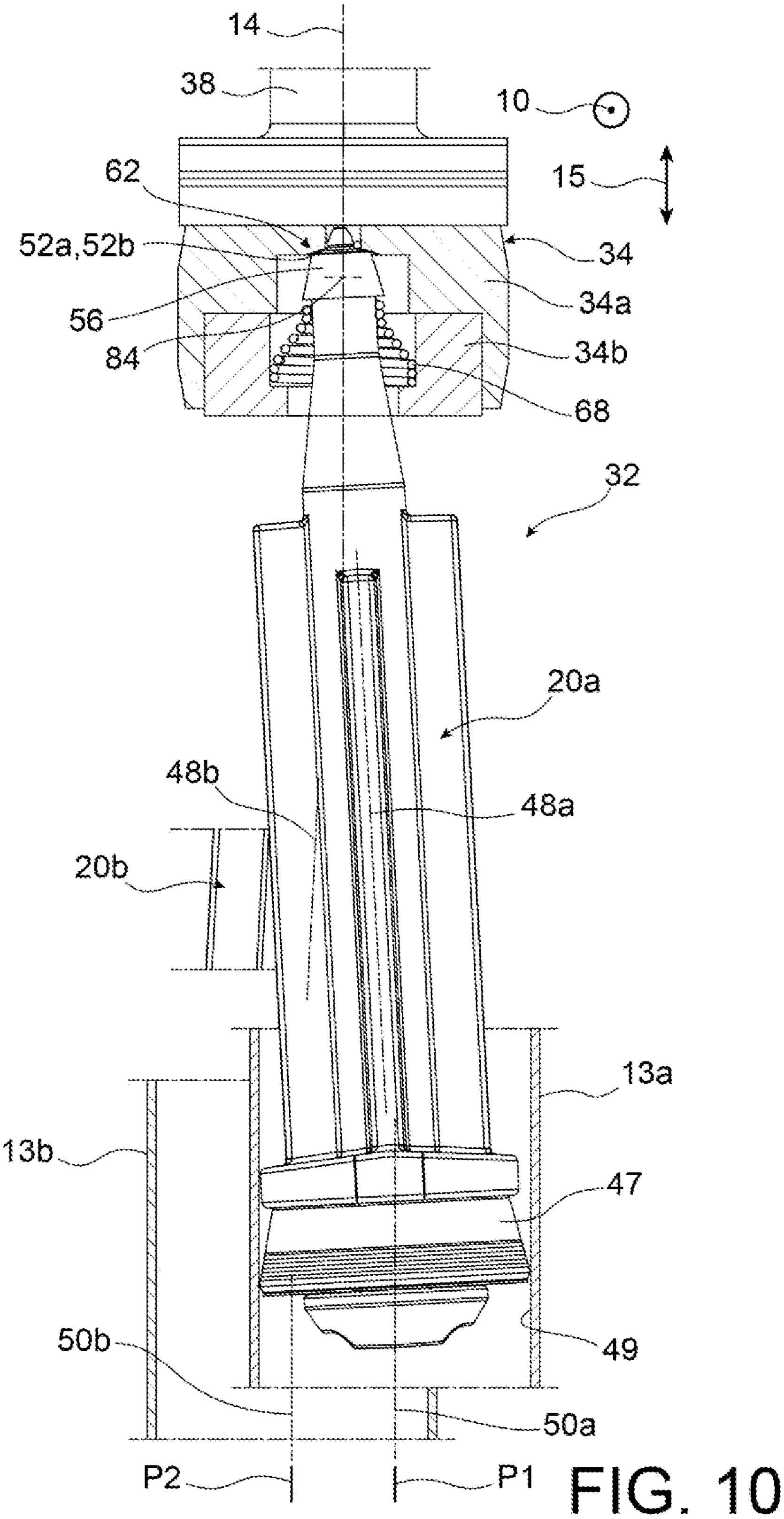
FIG. 10 shows a view similar to that of FIG. 5, with the device in the form of a second preferred embodiment of the invention.
Figure 11:
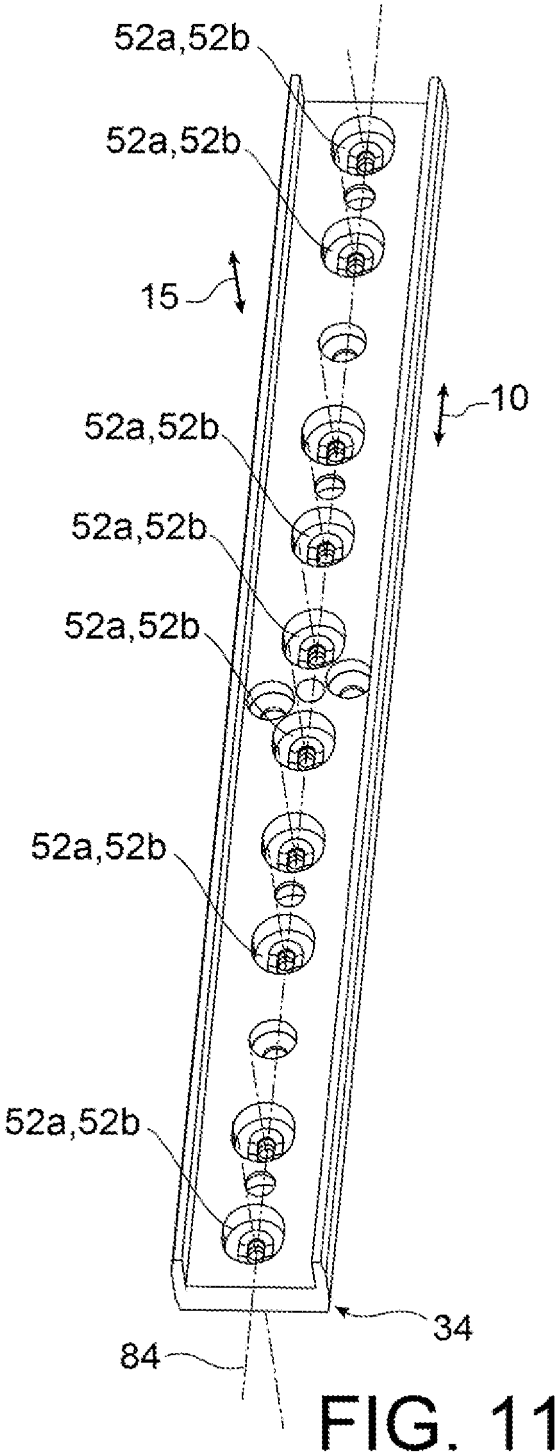
FIG. 11 shows a perspective view of the piston holder implemented in the second preferred embodiment.

Finally, the proposed solution also allows the piston seals 47 to withstand a high number of autoclave cycles, while providing the required seal at their associated chambers 13*a*, 13*b*. In this respect, it is noted that in a known and widely used manner in the field of pipetting systems, the autoclave consists of an operation allowing to sterilise parts in the presence of saturated steam, under certain temperature and pressure conditions. The combined action of temperature, pressure and water vapour can modify the dimensions of parts and in particular joints. Nevertheless, thanks to the degree of freedom of rotation given to each piston, the invention allows the seal to continue to ensure good sealing in its chamber, even with limited contact, because its position always remains optimal due to its ability to be repositioned in the chamber. FIGS. 10 and 11 show a second preferred embodiment of the invention, wherein the piston heads 56 are all aligned along a transverse line 84 arranged parallel to the transverse planes P1 and P2 defined by the axes 50*a*, 50*b* of the chambers 13*a*, 13*b*, remaining arranged in a staggered manner. The transverse line 84 is also located between the two planes P1 and P2. Consequently, the piston axes 48*a*, 48*b* are all inclined with respect to their corresponding chamber axes 50*a*, 50*b*, in a given direction for the first pistons 20*a*, and in the opposite direction for the second pistons 20*b*. The inclination of the piston axes 48*a*, 48*b* evolves during translation, but within a fairly small range of angles, ranging for example from 5 to 10°. The evolution of this inclination, during pipetting, is allowed by the elastic deformation of the springs 68 within the mechanical connections 62.

In this second embodiment, the seats 52*a*, 52*b* for receiving the piston heads 56 can also be all aligned on the piston holder 34, along the transverse line 84. This advantageously limits any secondary rake effect, likely to result from the offset between the two transverse rows of seats 52*a*, 52*b*, for example visible in FIGS. 5*a*, and 5*b*.

Of course, various modifications can be made by the person skilled in the art to the invention which has just been described, only by way of non-limiting examples, and the scope of which is limited by the appended claims. For example, the invention could also apply to cases where the axes of all the chambers and the axes of all the pistons are located in the same plane, as shown in the third embodiment of FIGS. 12 to 14, for example intended for lower volume samplings.

In this third embodiment, the features of which can be combined and/or interchangeable with those of the embodiments described above, each tip 6 is made in one-piece with its associated suction chamber 13*a*, 13*b*.

Figure 12:
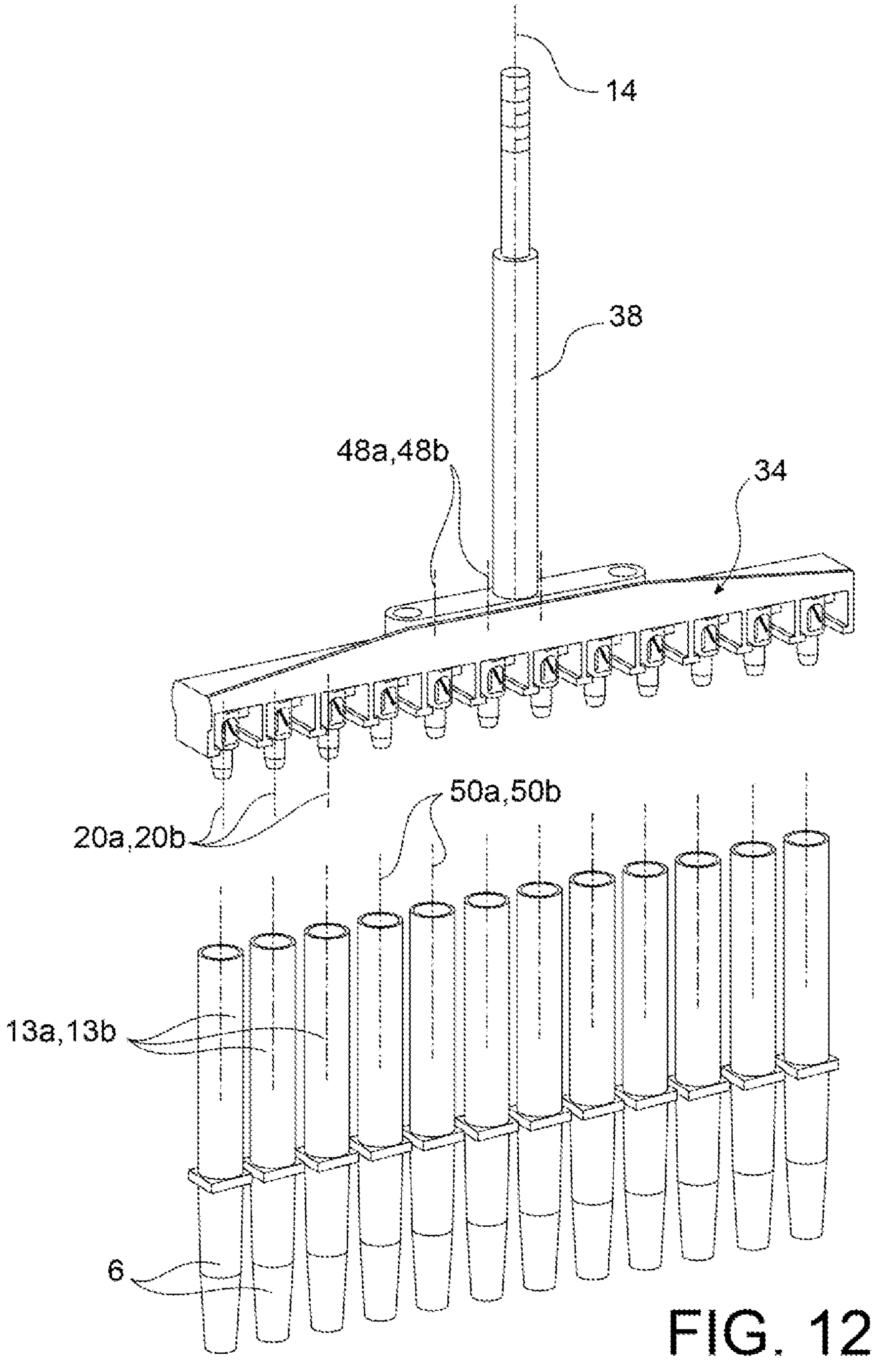
FIG. 12 shows a partially exploded perspective view, showing the device according to a third preferred embodiment of the invention.
Figure 13:
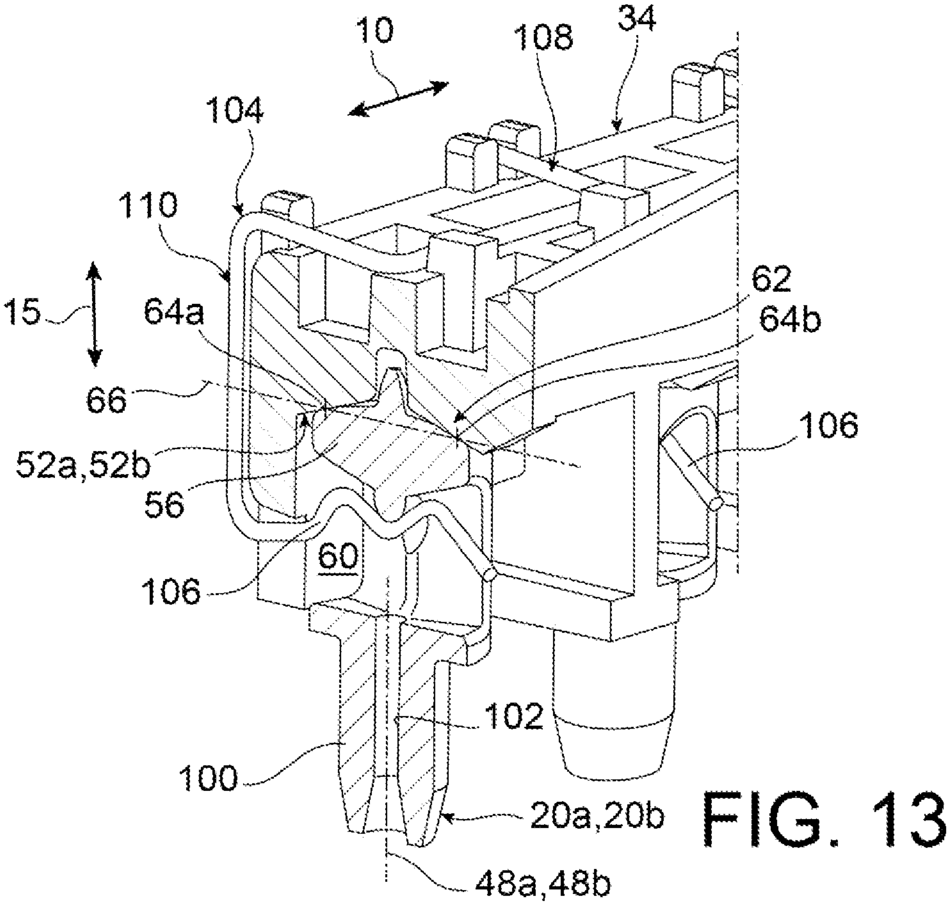
FIG. 13 is a sectional view along a plane orthogonal to the piston holder of the previous figure.
Figure 14:
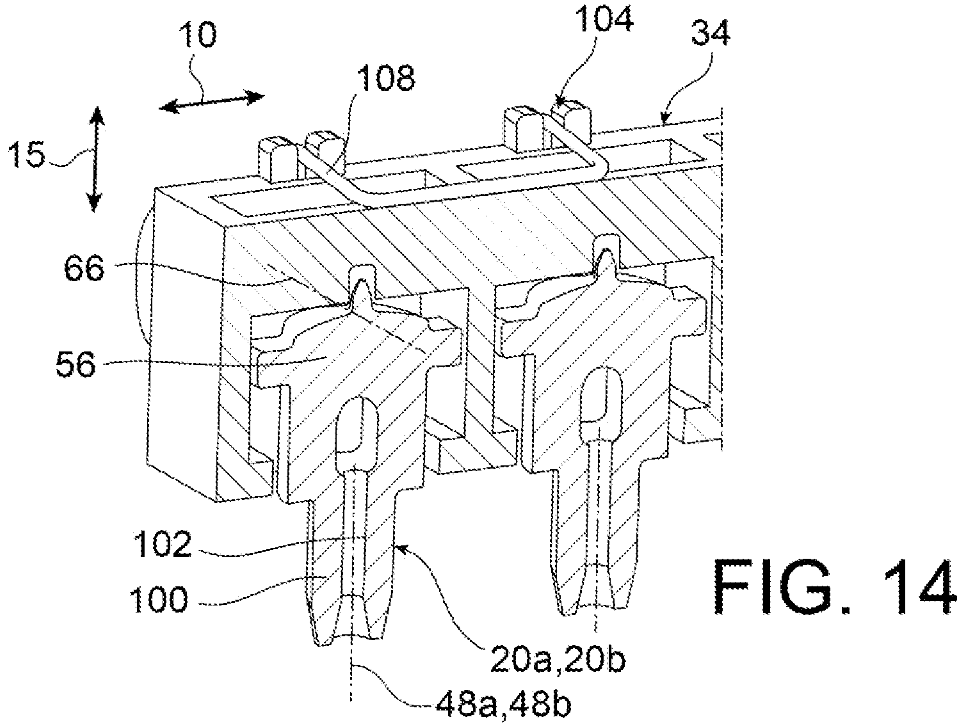
FIG. 14 is a sectional view along a plane parallel to the piston holder of FIG. 12.

In these FIGS. 12 to 14, only the upper part of the head of each piston 20*a*, 20*b* has been shown. The lower part, not shown, is intended to be coupled with this upper part. According to a first possibility, for example considered for the sampling of volumes of the 200 and 300 μl type, the lower part of the piston is provided to receive the tip 100 of the upper part by fitting. According to a second possibility, for example considered for the sampling of smaller volumes of the 10 or 20 μl type, it is the lower part of the piston which is provided for coupling by press-fitting into the bore 102 of the upper part incorporating the piston head 56.

In this third embodiment, another particularity lies in the elastic return means for holding the piston head 56 against the rake 34. These means here take the form of a clip 104 made in a wired manner, in particular comprising two end branches 106 each substantially orthogonal to the directions 10 and 15, and axially bearing against two piston heads 56, respectively. The clip adopts a general C shape, with the lower part of the C formed by the two substantially parallel end branches 106, with the upper part 108 of the C axially bearing against an upper surface of the rake 34, and with a central part 110 of the C bypassing the rake 34 in the direction orthogonal to the direction 10.

Consequently, each clip 104 is produced by a deformed wire which, thanks to its general C shape and its two end branches 106, allows to apply the return force to two adjacent piston heads 56. Alternatively, each wire-made clip could maintain a general U-shape, but apply a return force to only one piston head 56.

What is claimed is:

1. A device for a multi-channel pipetting system, the device comprising:

a piston holder extending in a transverse direction of the pipetting system;

a guide rod for guiding the piston holder, the guide rod extending parallel to a central longitudinal axis of the pipetting system, and orthogonal to the piston holder;

a guide member for guiding the guide rod, the guide rod being slidably mounted in the guide member, along the central longitudinal axis;

a plurality of pistons distributed along the piston holder, each piston having a lower end slidably housed in a suction chamber, as well as a piston head mounted on the piston holder via a mechanical mounting connection for mounting the piston on the piston holder;

a row of sampling cone holder tips distributed along the transverse direction of the pipetting system, each sampling cone holder tip communicating with one of the suction chambers, respectively, wherein the mechanical mounting connection, for at least one of the pistons, includes two contact points with the piston holder jointly defining an axis of rotation of the piston head, for the piston head to rotate around, oriented orthogonally or substantially orthogonally to the transverse direction and to the central longitudinal axis of the pipetting system, wherein the device further includes, associated with said piston, elastic return means forcing the piston head upwards against the piston holder, such that the piston head and the piston holder are in contact with each other at the two contact points.

2. The device according to claim 1, wherein the elastic return means are formed by a helical spring of generally conical shape, with a section that tapers from the bottom upwards, or in that the elastic return means are formed by a spring in the form of a deformed wire.

3. The device according to claim 1, wherein the piston holder has two opposite free transverse ends.

4. The device according to claim 1, wherein the guide rod is slidably mounted in the guide member, via two sliding rotation connections spaced from each other along the central longitudinal axis.

5. The device according to claim 1, wherein each piston carries, at its lower end, a seal bearing against an inner surface of the suction chamber associated with the piston.

6. The device according claim 5, wherein the seal is a lip seal.

7. The device according to claim 1, wherein the two contact points of each mechanical mounting connection are arranged symmetrically with respect to an associated piston axis.

8. The device according to claim 1, wherein the two contact points of each mechanical mounting connection are made in any of the following ways:

using a toroidal surface provided on the piston, and two flat surfaces inclined relative to each other, and provided on the piston holder;

using a spherical surface provided on the piston, and two flat surfaces inclined relative to each other, and provided on the piston holder;

using a conical surface provided on the piston, and two spherical surfaces provided on the piston holder;

using a flat surface provided on the piston, and two spherical surfaces provided on the piston holder;

using a spherical surface provided on the piston, and two spherical surfaces provided on the piston holder;

using a spherical surface provided on the piston, and two cylindrical surfaces provided on the piston holder, with secant axes; or using a toroidal surface provided on the piston, and two cylindrical surfaces provided on the piston holder, with secant axes.

9. The device according to claim 1, wherein the suction chambers have parallel chamber axes.

10. The device according to claim 9, wherein all the chamber axes are arranged in the same transverse plane of the pipetting system.

11. The device according to claim 9, wherein the chamber axes are arranged in a staggered manner in two separate parallel transverse planes of the pipetting system.

12. The device according to claim 11, wherein the piston heads are also arranged in a staggered manner in the same two transverse planes defined by the chamber axes, so that these chamber axes coincide in pairs with piston axes.

13. The device according to claim 11, wherein the piston heads are all aligned along a transverse line arranged parallel to and between the two transverse planes defined by the chamber axes, so that piston axes are inclined with respect to their corresponding chamber axes.

14. The device according to claim 1, wherein the piston holder is made in two parts fixed on each other, and between which are arranged the piston heads and the elastic return means, or in that the piston holder is made in one-piece.

15. A multi-channel pipetting system comprising a device according to claim 1, the pipetting system being a manual, motorised or hybrid sampling pipette, or else a cassette forming a lower part intended to be connected to an articulated arm of an automaton.

* * * * *